Nov. 6, 1962  J. C. M. FROST  3,062,482
GAS TURBINE ENGINED AIRCRAFT
Filed Aug. 25, 1953  8 Sheets-Sheet 1
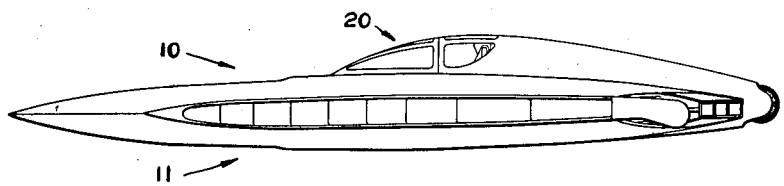
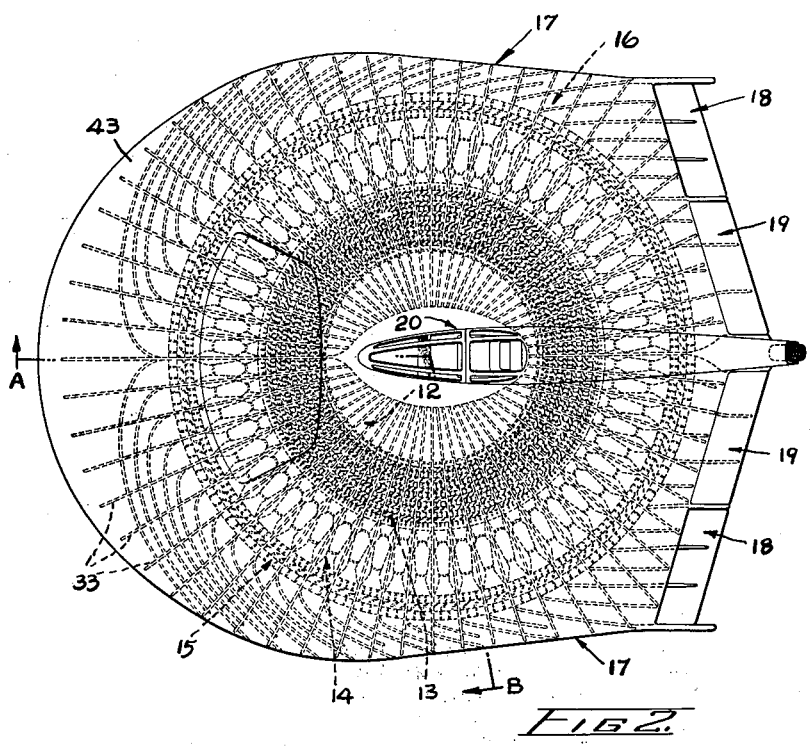
INVENTOR
J.C.M. FROST
BY
Maybee & Legris
ATTORNEYS.

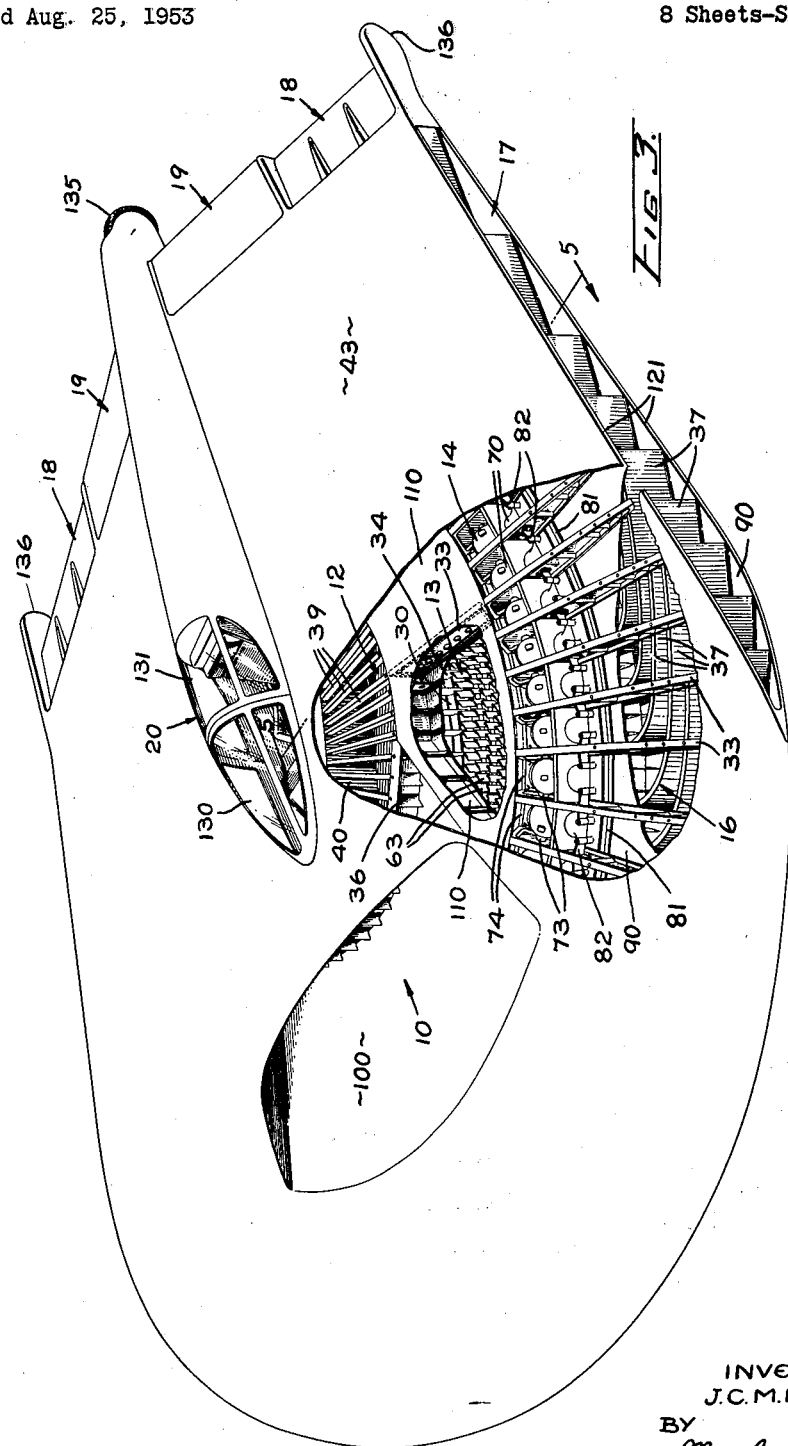

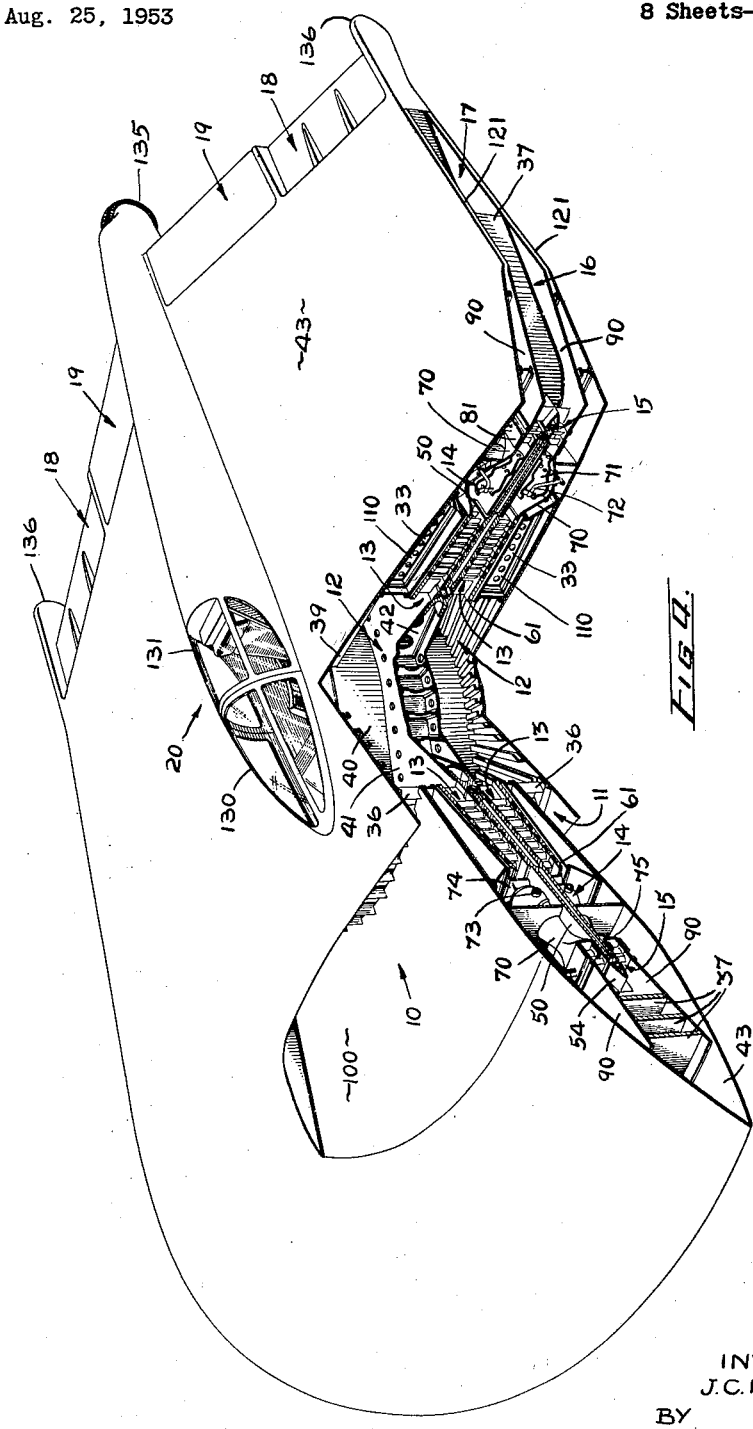

Nov. 6, 1962    J. C. M. FROST    3,062,482
GAS TURBINE ENGINED AIRCRAFT
Filed Aug. 25, 1953    8 Sheets-Sheet 4
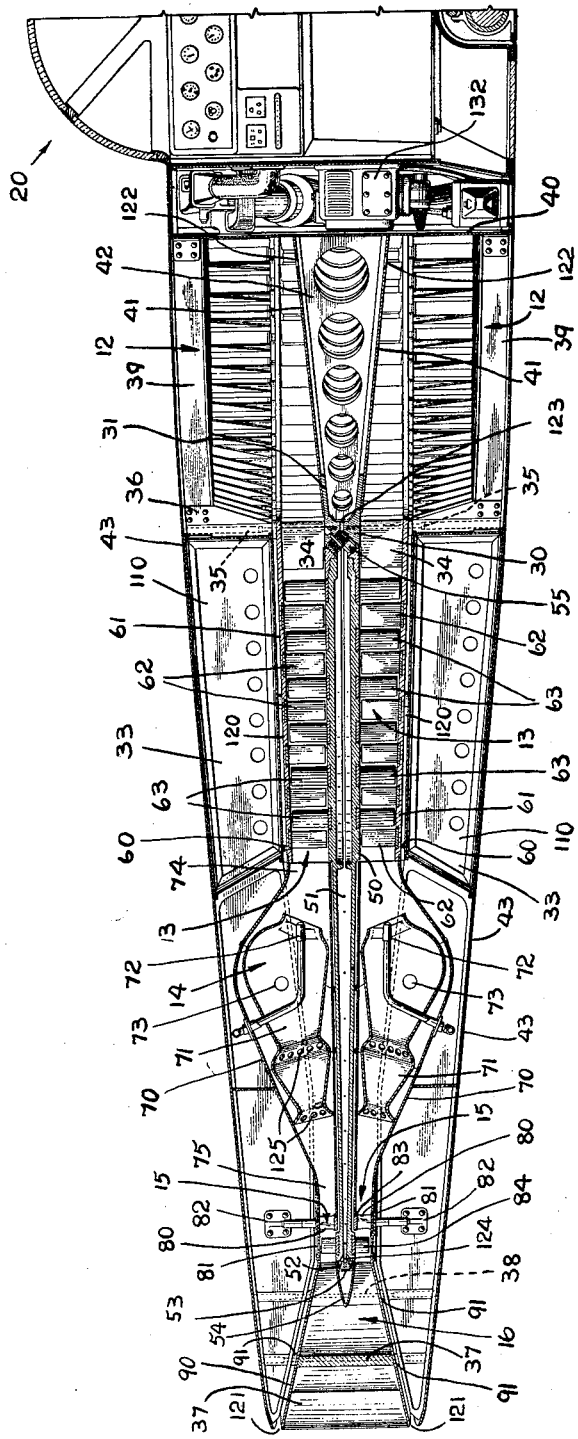
INVENTOR
J.C.M.FROST
BY
Maybee & Legris
ATTORNEYS.

Nov. 6, 1962 J. C. M. FROST 3,062,482
GAS TURBINE ENGINED AIRCRAFT
Filed Aug. 25, 1953 8 Sheets-Sheet 5
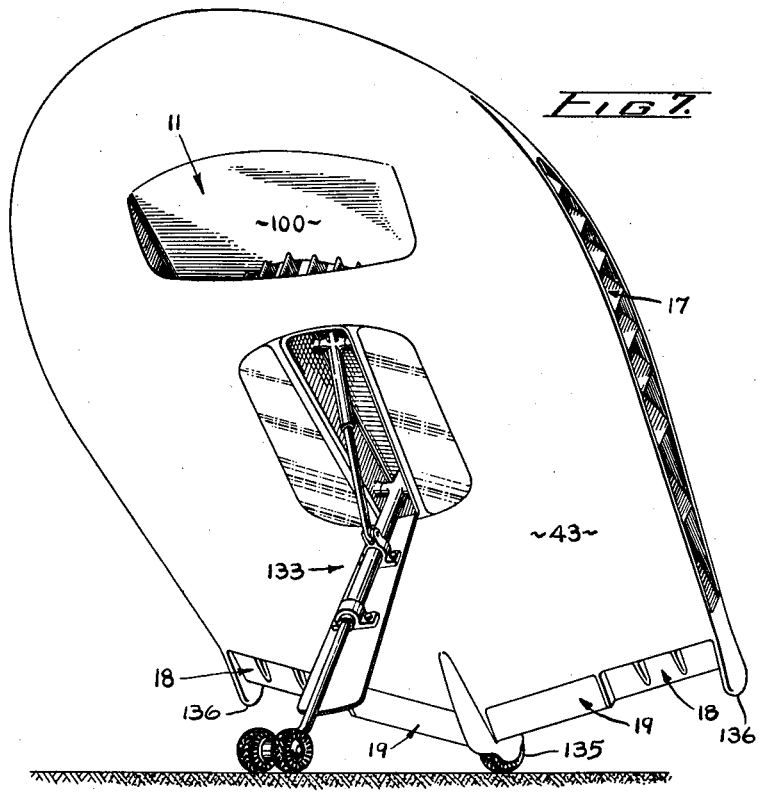
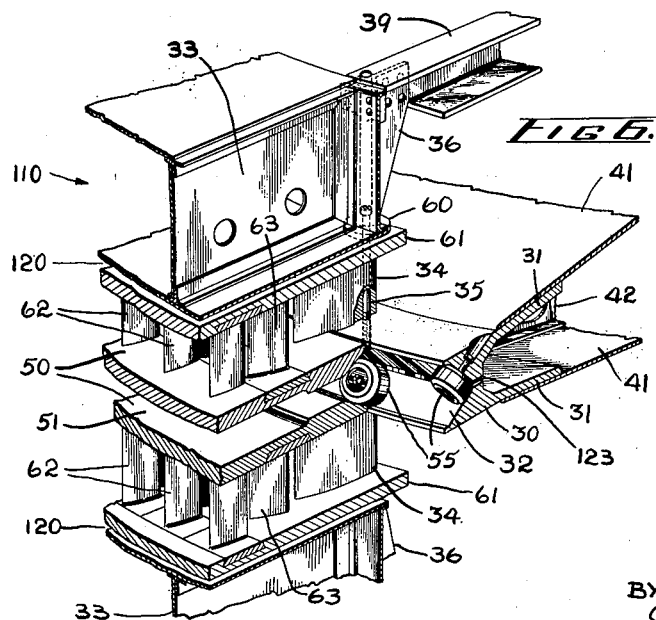
INVENTOR
J.C.M.FROST
BY
Maybee & Legris
ATTORNEYS.

Nov. 6, 1962　　　J. C. M. FROST　　　3,062,482
GAS TURBINE ENGINED AIRCRAFT
Filed Aug. 25, 1953　　　8 Sheets-Sheet 6
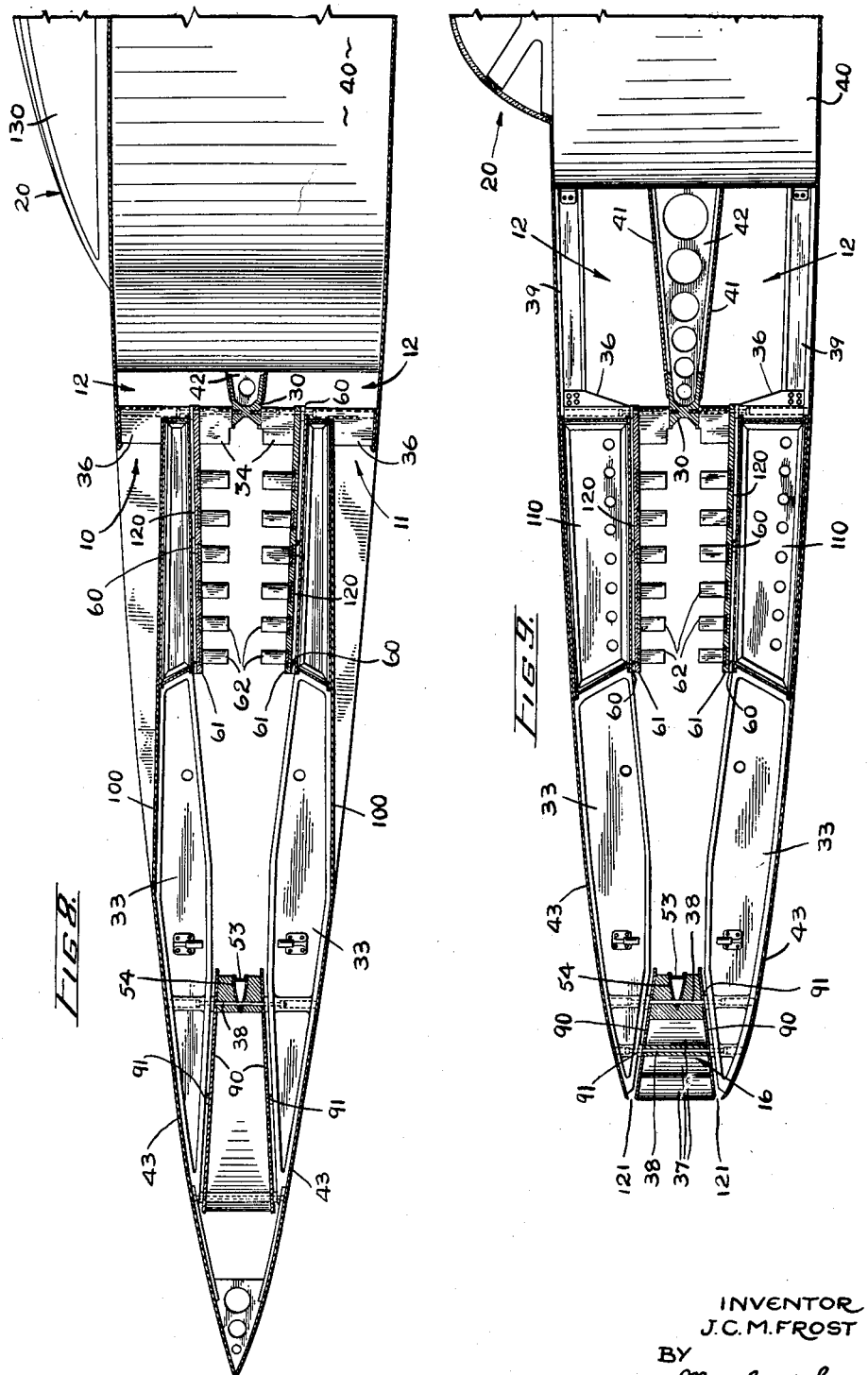
INVENTOR
J.C.M.FROST
BY
Maybee & Legris
ATTORNEYS.

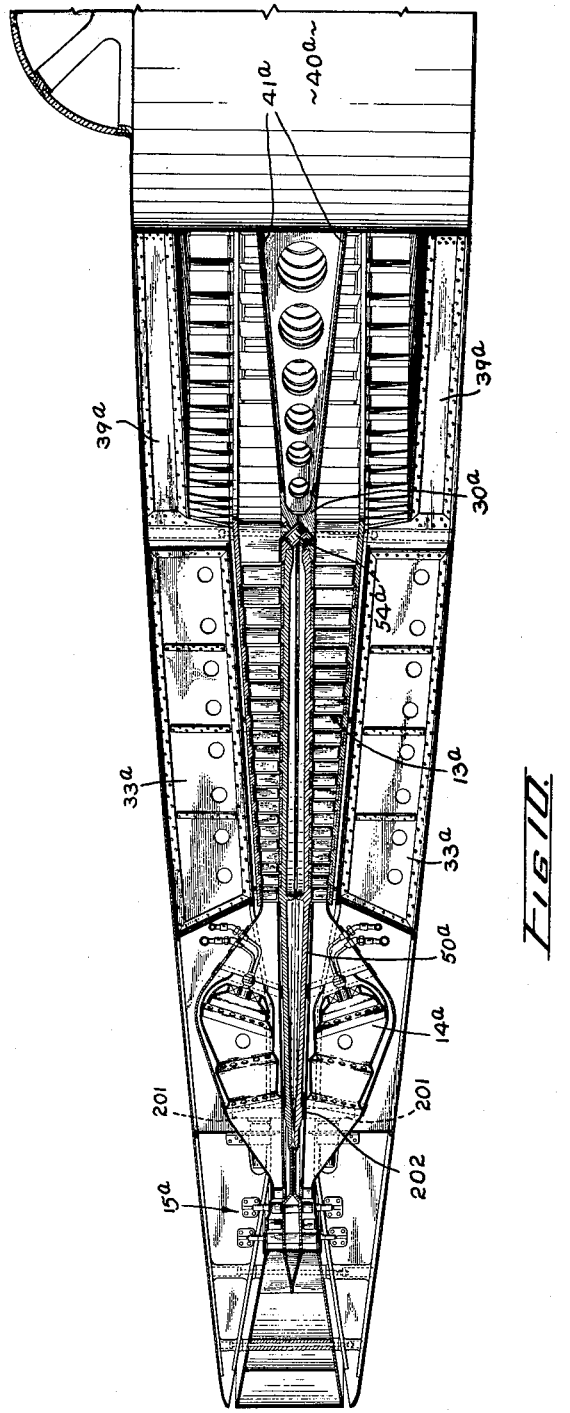

Nov. 6, 1962  J. C. M. FROST  3,062,482
GAS TURBINE ENGINED AIRCRAFT

Filed Aug. 25, 1953  8 Sheets-Sheet 8

INVENTOR
J.C.M.FROST
BY
Maybee & Legris
ATTORNEYS.

United States Patent Office 3,062,482
Patented Nov. 6, 1962

3,062,482
GAS TURBINE ENGINED AIRCRAFT
John Carver Meadows Frost, Georgetown, Ontario, Canada, assignor to A. V. Roe Canada Limited, Malton, Ontario, Canada, a corporation
Filed Aug. 25, 1953, Ser. No. 376,320
Claims priority, application Great Britain Aug. 25, 1952
29 Claims. (Cl. 244—15)

The invention relates to aircraft, and more particularly to aircraft deriving a propulsive thrust from gas turbine engines.

According to conventional practice this type of aircraft is provided with one or more gas turbine engines, each engine being mounted with its axis substantially in the direction of flight and discharging its exhaust gases axially and rearwardly to furnish a propulsive thrust. With this conventional arrangement it is, of course, important to construct the engine with as small a cross-sectional area as possible, consistent with power output, in order to minimize the frontal area presented to the air through which it must pass. In consequence, such engines invariably are constructed with axial flow or with centrifugal compressors, and with axial flow turbines, the compressors and turbines being of small diameter and running at very high speeds, the limiting factor of the speed of rotation being the tip speeds of the rotating blades. Furthermore, since such engines have a generally circular cross-section transversely to the direction of flight, their outer envelopes can provide relatively little aerodynamic lift and, though these engines can be buried in the aerofoil surfaces of large airframes, they cannot themselves be adapted to form the said aerofoil surfaces. Hence, an aircraft heretofore has comprised an engine which per se has little aerodynamic lift plus an unavoidably heavy airframe structure in which the engine is buried and which is required to give the engine the necessary aerodynamic lift; the engine per se accounts for only a relatively small proportion of the total volume and mass of the conventional aircraft.

It is the main object of the invention to provide an aircraft in which the engine and the airframe are integral, so that its aerodynamic lift is provided solely by the outer envelope which encloses the integral airframe and engine.

It is another object of the invention to provide an aircraft having a ratio of static thrust relative to gross take-off weight substantially greater than one.

It is a further object of the invention to provide an aircraft which can take-off and land substantially vertically and which has a controllable speed range varying from zero to speeds considerably beyond the velocity of sound.

The foregoing and other objects and advantages of the invention will become apparent from a study of the following specification, taken in conjunction with the accompanying drawings, in which like reference characters indicate corresponding parts throughout the several views, and in which:

FIG. 1 is a side elevation of an aircraft constructed in accordance with the invention and shown as it appears when in flight;

FIG. 2 is a top plan view of the said aircraft and in which major internal details are depicted by dotted lines;

FIG. 3 is a perspective view of the said aircraft, partly broken away to show structural details;

FIG. 4 is a perspective view of the said aircraft, with a sectional fragment removed;

FIG. 5 is a transverse cross-sectional view of one-half of the said aircraft, along the line 5—5 of FIG. 3;

FIG. 6 is a fragmentary perspective view particularly illustrating the rotor supporting bearing assembly of the said aircraft;

FIG. 7 is a perspective view of the said aircraft in take-off position;

FIG. 8 is a cross-sectional view of the aircraft taken through the radial plane indicated at A in FIG. 2, with the rotor and also most background detail removed for greater clarity;

FIG. 9 is a cross-sectional view of the aircraft taken through the radial plane indicated at B in FIG. 2, with the rotor and also most background detail removed for greater clarity;

FIG. 10 is a transverse cross-sectional view generally similar to FIG. 5, and illustrating the structural details of a slightly modified version of the said aircraft;

Figure 12:
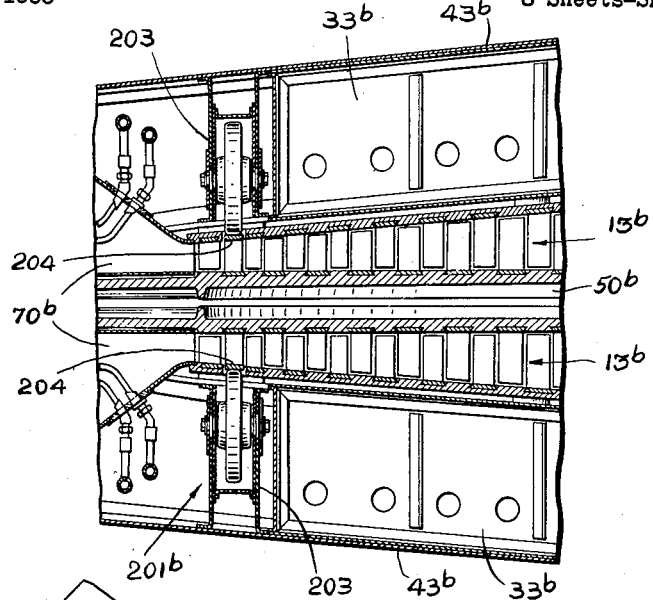
FIG. 12 is a fragmentary cross-sectional view of components of an aircraft similar to that illustrated in FIGS. 10 and 11, but showing a modified outboard bearing arrangement.

It is proposed to describe herein firstly the general arrangement of a preferred embodiment of an aircraft constructed in accordance with this invention; then under separate headings the various main features of the said aircraft and its operation will be explained; finally, the modified embodiments illustrated in FIGS. 10–12 will be described.

For greater convenience throughout the description certain terms of positional relationship are used: the terms "outboard" (or "outboardly") and "inboard" (or "inboardly") denote, respectively, greater and lesser distances from the axis of rotation of the rotor, and the terms "outer" and "inner" similarly denote greater and lesser distances from a medial plane of the aircraft coinciding with the plane of the rotor.

Briefly, an aircraft constructed in accordance with the invention can be described as comprising a structure of generally lenticular form and which is sheathed by opposed aerofoil surfaces generally converging towards each other in an outboard direction from their central inboard portions to their perimetrical edges, and a radial flow gas turbine engine disposed between the said aerofoil surfaces and having a disc-like rotor the plane of rotation of which is approximately parallel to the medial plane between the said opposed surfaces. Referring to FIGS. 1 and 2, air enters the inlets 10 and 11 provided in the aerofoil surfaces, then after passing through chambers 12 it flows radially outboardly through a double-sided multi-stage radial flow compressor 13, then into an annularly disposed combustion system 14 where it supports combustion of the fuel and from which the products of combustion or gases expand through a radial flow turbine 15 into a multiple jet-pipe assembly 16 which directs the flow of gases primarily in a rearward direction to produce a forward propulsive thrust. The direction of flow of the air and of the products of combustion can be particularly understood from a perusal of FIG. 2. Preferably, about three-fifths of the jet exhaust flows from the sides 17 of the aircraft rearwardly, and the remainder is ejected from the trailing edge through control members comprising elevons 18 and trimmers 19. The flow of compressed air and the products of combustion, prior to entry in the jet pipe assembly, is in generally radial, or centrifugal directions which are normal to the directional, or yaw axis of the aircraft. Accommodation for the pilot is provided in an occupancy chamber or cockpit 20 which is illustrated as being lozenge-shaped and is located at the centre of the aircraft; it might be said that the pilot's cockpit is in the stationary hub of the engine and that the engine rotor rotates around it.

Skeletal Structure

The various structural components of the engine are mutually reinforced, and to determine what is the main component of the structure is problematical. In one respect, the central hollow hub from which the rib assemblies radiate can be considered as the "keystone" of the airframe. However, it may be more accurate and at least for convenience of description it is preferable to consider bearing member or ring 30 (see particularly FIG. 6) as the main structural component. The ring 30 is generally U-shaped in transverse cross-section and it includes a pair of inboardly extending legs 31 and a circumferential outboardly extending V-shaped channel 32 the walls of which preferably are at 90° to each other.

Pairs of angularly spaced rib members 33 radiate outboardly from the ring 30, the two members of each pair being disposed relative to each other in a generally enantiomorphous arrangement and being secured respectively at their inboard ends to the opposite outer faces of the ring 30 through struts 34 which provide spacers between the ring and the rib members. The rib members and the struts are secured to the ring by long cap screws 35 which pass through bores provided in fishplates 36 of the rib members; the heads of the cap screws seat on shoulders and the shanks pass through bores in the struts, the threaded ends being screwed into tapped holes in the ring. The outboard ends of the rib members of each pair are held together in spaced relationship by suitable spacers including the transverse walls 37 of the jet-pipe assembly 16; bolts 38 clamp the said outboard ends together. It will be apparent that the ensemble of rib members encompasses an annular space, particularly defined by the inner opposed edges of the members of each pair. The outer edges of the ensemble of rib members generally define the outer configuration of the aircraft.

As will be observed particularly in FIGS. 8 and 9 of the drawings, the ribs preferably are "built-up" members, and they include appropriate flanges and stiffeners; in a general way, they gradually taper from the inboard to the outboard ends. The structure consists of two symmetrical halves on either side of the longitudinal centre line of the aircraft, which provides an axis of symmetry. Although the many rib members generally are similar to one another (there are 60 pairs in the aircraft described), they are not identical, since the aircraft is not a perfect disc; the rib members are of varying overall lengths, and more noticeably those which radiate toward the leading edge are longer than those which radiate toward the sides. Furthermore the outboard ends of the various rib members must have differing tapers since, as will be noticed particularly in FIGS. 3, 4 and 7, the leading edge of the aircraft tapers to a sharp edge while its sides and its trailing edges have appreciable thickness in order to accommodate the jet pipe assembly 16. In addition the outer faces or edges of the ribs which are adjacent the air inlets 10 and 11 must be somewhat cut back in order to accommodate the said air inlets, as will be described subsequently. However, the ribs on either side of the axis of symmetry which are equiangularly spaced from the said axis (all the angular measurements being from the same origin), preferably are identical.

Secured to the ring 30 through each of the fishplates 36 and the cap screws 35 are inboardly extending radial ribs or channel members 39. The inboard ends of the channel members are secured to a perimetrical wall 40 which defines the cockpit 20. The outer edges of the channel members 39 are in the same slightly convex surface as the outer edges of the rib members 33.

Annular walls 41 which provide the inner walls of the plenum chambers 12 respectively are secured at their outboard peripheries to the legs 31 of the ring 30 and at their lozenge-shaped inboard peripheries to the wall 40. The walls are mutually reinforced by radial spacers 42.

Riveted to the outer edges of the rib members 33 and of the channel members 39, and thus enclosing the structure are skins 43 which together provide an envelope which in diametrical cross-section is substantially lenticular; the skins provide an aerofoil which gives the aircraft aerodynamic lift, and also reinforces the structure. As best seen in FIG. 4, the two skins taper and meet at the leading edge of the aircraft, whilst at its sides and at its trailing edge they are spaced by the jet pipe assemblies 16.

It will already be apparent that the frame of the engine as such also is the frame of the aircraft; in other words, the invention in effect provides a "flying engine."

Rotor Structure and Suspension

The compressor 13 and the turbine 15 have a common rotor 50, which comprises two similar annular discs, secured together in face to face relationship so that a space 51 is provided therebetween. At its outer periphery the rotor is encompassed by a channel-shaped rim 52 which provides a rubbing strip. The rubbing strip registers in, but normally is spaced from, an inboardly facing ring 53 held within a V-shaped annulus 54 which is secured to the afore-described skeletal structure within the jet pipe assembly 16.

The rotor is rotatably mounted at its inboard periphery on the bearing ring 30 through two groups of roller bearings 55 which are set at 45° to the plane of rotation of the rotor and alternately at 90° to each other to carry both axial and radial loads. The inboard portion of the rotor 50 provides a rotor for the compressor 13, while the outboard portion provides a rotor for the turbine 15. The combustion system 14 is located adjacent the portion of the rotor which is intermediate the inboard and the outboard portions. It will be noted that the rotor divides into two halves the aforementioned annular space outlined by the inner edges of the ensemble of pairs of rib members 33.

Compressor

Secured to the inner edges of the rib members 33 but spaced therefrom by spacers 60 are annular discs which provide two annular stator casings 61. Concentric rings of blades of aerofoil section with their longitudinal axes substantially parallel to the axis of rotation are provided in the spaces between the stators and either side of the rotor. Alternate rings comprise stator blades 62 having their root ends secured to a stator casing 61 and their other ends extending towards the rotor 50, while the other rings comprise rotor blades 63 having their root ends secured to the rotor 50 and their other ends extending toward a stator casing 61. The blades may be secured to the stators or to the rotor by any conventional means, such as dovetails.

Thus, there is provided a double-sided multi-stage radial flow compressor 13 having circuferential inlets at its inboard periphery and circumferential outlets at its outboard periphery. The compressor of the aircraft particularly illustrated in FIGS. 3, 4 and 5, is a six-stage compressor. The two annular passages defined by the rotor 50 and the stator casings 61 at either side thereof progressively converge towards each other radially from the inboard periphery toward the outboard periphery, and the blades which span the passage correspondingly are of progressively decreasing length from the inboard rings to the outboard rings.

Combustion System

Located in the spaces between adjacent rib members 33 on both sides of the rotor 50 are radially extending combustion chambers 70 of the annularly disposed combustion system 14. Although the combustion chambers are unsymmetrical in transverse cross-section, they are nevertheless of conventional design. Each includes a flame tube 71, suitable ignitors, and burners 72. The flame tubes of adjoining combustion chambers are connected by interconnectors 73. The inlet of each combustion chamber is formed into a rectangular opening 74 so that the two series of adjacent openings constitute circumferential inlets registering with the circumferential outlets of the compressor 13. Likewise, the combustion chamber outlets 75 terminate in rectangular openings or nozzle boxes so that the two series of adjacent outlets constitute circumferential outlets registering with the circumferential inlets of the turbine 15.

Turbine and Exhaust

Disposed in concentric rings adjacent the circumferential outlets 75 of the combustion chambers 70 are stator blades 80 of the turbine 15. The stator blades are firmly secured at their root ends to bridging members 81 which extend between the combustion chamber outlets 75 and the jet pipe assemblies 16, these bridging members being adjustably connected by means 82 secured to the ribs 33. It will be noted particularly from FIG. 3 that preferably the bridging members which together constitute the stator ring of the turbine are not a continuous ring but they are a number of annulus sectors, there being one sector for each space between adjacent rib members 33. At the other ends of the stator blades are annular shrouds 83. The stator rings and the shrouds, between which extend the stator blades, provide circumferential inlets for the turbine.

Extending from each side of the rotor 50 adjacent the turbine stator blades 80 is a ring of turbine rotor blades 84; they are secured to the rotor by conventional means, as by dove-tails. Both the stator blades 80 and the rotor blades 84 are of aerofoil section, with their longitudinal axes substantially parallel to the axis of rotation of the rotor 50.

Around the circumferential outlet of the turbine are the jet-pipe assemblies 16. These are formed by two outboardly diverging walls 90, each being secured to the inner edges of the rib members 33 and spaced therefrom by spacers 91, the inboard peripheries of the walls registering with the stator rings of the turbine provided by the bridging members 81, and by the two series of transverse walls 37, one series being on each side of the longitudinal axis of symmetry of the aircraft. The walls 90 and 37 together constitute ducts, the inboard ends of which are radially directed and register with the circumferential outlet of the turbine. The outboard ends of the ducts situate in the aft portion of the aircraft terminate in a common fishtail at the trailing edge of the aircraft, whilst the remaining ducts on either side of the axis of symmetry are curved adjacent their inlet ends to extents which are progressively greater with increases in the angular distance between the respective ducts and the central duct of the fishtail. The curved ducts are swept back and terminate at the sides 17 of the aircraft. Due to the rearward sweep of these ducts the discharges therefrom are substantially tangential to the edges of the aircraft and they have thrust components which are predominantly rearward.

Air Intake

Referring particularly to FIGS. 4 and 8, the air inlets 10 and 11 are provided by large openings in the skins 43 in the leading quarter-sector of the aircraft. It can be said that the inlets or intakes are in a portion of the structure which is generally central planformwise. Of necessity, the outer faces or edges of the ribs 33 in that sector are cut-back, and skins 100 are riveted to the cut-back portions of the said ribs. Air entering the intakes, after passing through the chambers 12, is drawn into the circumferential compressor inlets.

Fuel Supply System

Fuel tanks 110, which are C-shaped, are provided in the spaces between the compressor stator casings 61 and the skins 43. The "breaks" in the tanks (corresponding to the open side of the C) are to accommodate the air inlets 10 and 11. As will be apparent from the drawings, the ribs 33 pass through the tanks.

Fuel is conducted by appropriate supply lines and pumps from the tanks 110 to the burners 72 of each combustion chamber 70.

Cooling System

Complete provision is made for cooling those portions of the aircraft which otherwise would overheat.

Narrow passages 120 are provided between the inner surfaces of the fuel tanks 110 and the outer surfaces of compressor stator casings 61. Air is bled from the plenum chambers 12, and flows radially outboardly through the said passages, thus cooling the compressor. The said air then scrubs the outer surfaces of the combustion chambers 70, thus cooling the combustion chambers, and finally it is ejected through peripheral slots 121 provided between the skins 43 and the walls 90 of the jet pipe assemblies.

To cool the rotor, apertures 122 are provided in the annular walls 41, and thus air is bled from the chambers 12 into the space within the said walls, thence flows through a series of apertures 123 provided in the ring 30 and into the passage 51 within the rotor 50. The said air flows radially outboardly through the said passage and is discharged through apertures 124 in the rim 52 of the rotor.

In addition, cooling air from the compressor 13 flows through the spaces between the outer walls of the combustion chambers 70 and the flame tubes 71 and is ejected through holes 125 provided in the downstream ends of the flame tubes and then mixes with the products of combustion.

Pilot Accommodation, Landing Gear, and Controls

Accommodation for the pilot is provided in the cockpit 20 which is defined by the wall 40 at the centre of the aircraft. A windshield 130 and a canopy 131 of conventional design, covering the pilot's cockpit, protrude above the contour of the upper skin 43. Within the structure and adjacent the cockpit (see FIG. 5) are provided a cockpit pressurization system and conventional auxiliaries generally indicated at 132.

Pivotally mounted in a wheel well below the cockpit (see FIG. 7) is a main landing gear strut 133 having dual wheels 134 at its lower end, and which is adapted to retract into the wheel well when the aircraft is in flight. In addition, a tail wheel 135 is mounted at the centre of the fishtail on the longitudinal axis of the aircraft. Lateral stability on the ground is furnished by bumpers 136 on the tips of the fishtail.

At either side of the wheel well are transparent panels 137 which provide observation ports; these are particularly helpful when the pilot is landing the aircraft.

Flight control is effected by the elevons or movable flaps 18 mounted on the fishtail and situate immediately behind the orifices of the jet-pipe assembly 16 so that they will be operable upon the discharge from the said orifice. In addition, the trimmer flaps 19 may be provided. The elevons and the trimmer flaps are linked by conventional means to a control column in the cockpit 20.

Operation

In operation, air enters the inlets 10 and 11 whence it is rammed into the chambers 12 and thence into the radial compressor 13. The air is compressed by the compressor as in the orthodox gas turbine engine cycle, then flows radially outboardly into the combustion system 14 where it supports the combustion of fuel. The expanded products of combustion are discharged through the radial turbine 15 (whereby the compressor is driven), the exhaust from the turbine being ducted rearwardly by the jet-pipe assembly 16 to provide a forward propulsive thrust.

Alternative Constructions

The first alternative structure, which is illustrated in

Figure 11:
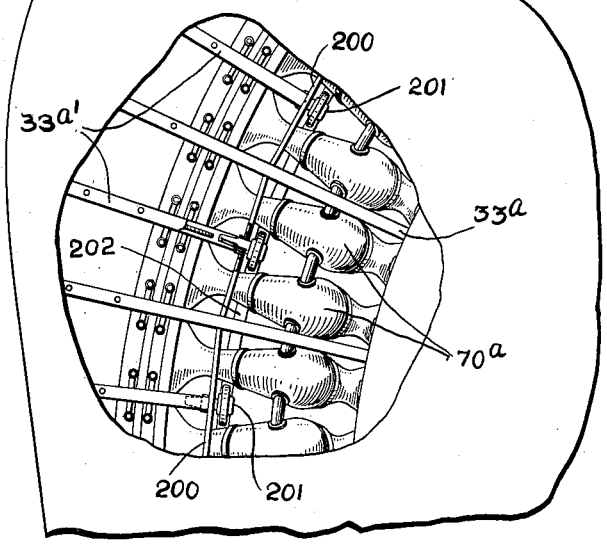
FIG. 11 is a fragmentary plan view of a typical outboard segment of the aircraft illustrated in FIG. 10 and showing details of structural members and the relative position of outboard bearings.

FIGS. 10 and 11 generally is similar to the machine previously described. The skeletal frame includes a ring 30a to which are secured pairs of outboardly extending rib members 33a, pairs of inboardly extending channel members 39a and annular walls 41a; a cockpit 20a is defined by a perimetrical wall 40a.

However, it will be noted from FIG. 11 that in this embodiment of the invention there are only half as many ribs 33a as there are ribs 33 in the first described embodiment, and that two combustion chambers 70a (instead of one as in the first described embodiment) are located between adjacent ribs. Furthermore, short reinforcing ribs 33a' extend outboardly from gusset plates 200 which span between adjacent ribs 33a, to the outboard perimeter of the aircraft.

In this embodiment of the invention there is provided an eleven-stage high-compression compressor 13a and a two-stage turbine 15a. Structurally, the compressor 13a is similar to the compressor 13 of the first described embodiment and likewise the turbine 15a is similar structurally to the turbine 15. There are minor variations in the combustion system 14a, but these need not be discussed.

The essential distinction between the two machines is in the rotor suspensions. The rotor 50 of the first embodiment has a cantilever suspension, its outboard perimeter being free. In the present embodiment of the invention, there is in addition to inboard bearings 54a a series of outboard bearings 201 circumferentially arranged in the alternate spaces between combustion chambers 70a and secured to the gusset plates 200. These bearings comprise rollers which lightly engage the rotor 50a on races 202 provided thereon. The rollers serve to steady the rotor and to reduce deflections thereof, thereby minimizing the necessary running clearances at the tips of the blades.

The third embodiment of the invention is illustrated in FIG. 12 which is a fragmentary cross-sectional view of components of an aircraft similar to that illustrated in FIGS. 10 and 11, but showing a modified outboard bearing arrangement 201b. In that view there are shown rib members 33b, skins 43b, a fragment of an eleven-stage compressor 13b, a rotor 50b and the inlet ends of combustion chambers 70b. The distinctive feature of this machine is that the outboard bearings 201b are located adjacent the combustion chamber inlets instead of adjacent the outlets as in the second embodiment illustrated in FIGS. 10 and 11. These bearings comprise large rollers adjustably mounted on plates 203 and which support the outboard portion of the rotor 50b through a shroud ring 204 provided on the outboard ring of compressor rotor blades.

*Final Remarks*

It will be noted that by the arrangements described of an integral engine and aircraft it is possible to accommodate a proportionally much larger engine than has hitherto been practicable, since the frontal areas of all aircraft powered by axial flow gas turbine engines bear a much larger relationship to the thrust which engines of such relatively small diameters are capable of delivering. Furthermore, since according to the invention the structure of the engine itself is the primary structure of the entire aircraft a very substantial overall saving in weight can be achieved in comparison with the conventional constructions now in use.

It can readily be demonstrated that the power/frontal area ratio and the power/weight ratio of an aircraft according to this invention are such that its performance will be very high. A high degree of stability is provided by the gyroscopic affect of the large rotor, giving a stable platform for the firing of guns or rocket projectiles in the difficult conditions encountered at supersonic speeds. In addition, such gyroscopic stability is an asset in the slow speed control of an aircraft of substantially unit aspect ratio.

The scheme of providing positive control of the aircraft through the deflection of large thrust forces combines with the gyroscopic stability to provide an excellent low speed control down to and beyond the stalling speed, to zero speed. These characteristics combine with the unprecedented thrust/weight ratio, in enabling substantially vertical take-off and landing to be achieved. The paramount importance of this aspect of control needs no emphasis.

It will be understod that the forms of the invention herein shown and described are to be considered merely as examples. The aircraft is most unorthodox, and obviously many changes in the shape, size and arrangement of parts not only are possible but may be desirable in order that the machine may have optimum performance. Such changes may, of course, be made without departing from the spirit of the invention or the scope of the subjoined claims.

What I claim as my invention is:

1. An aircraft comprising a radial flow gas turbine engine, including a radial flow turbine having a circumferential outlet, an annularly disposed combustion chamber means nested inboard of the turbine, and a radial flow compressor driven by the turbine and nested inboard of the annularly disposed combustion chamber means, the turbine, the combustion chamber means and the compressor being concentric and lying in the same general plane; means encompassing the circumferential turbine outlet and directing exhaust gases therefrom to provide a propulsive thrust; and opposed aerofoil surfaces sheathing the axial ends of the engine and the encompassing means, the said aerofoil surfaces providing lift developing surfaces of the aircraft, the medial plane between the said surfaces being approximately parallel to the aforesaid general plane of the turbine, the combustion chamber means and the compressor.

2. An aircraft comprising a radial flow gas turbine engine, including a radial flow turbine having a circumferential outlet, an annularly disposed combustion chamber means nested inboard of the turbine, and a radial flow compressor driven by the turbine and having a circumferential air inlet at its inboard periphery and nested inboard of the annularly disposed combustion chamber means, the turbine, the combustion chamber means and the compressor being concentric and lying in the same general plane; means encompassing the circumferential turbine outlet and directing exhaust gases therefrom to provide a propulsive thrust; and opposed aerofoil surfaces sheathing the axial ends of the engine and the encompassing means, the said aerofoil surfaces providing lift developing surfaces of the aircraft, an opening being provided in at least one of the aerofoil surfaces, the medial plane between the said surfaces being approximately parallel to the aforesaid general plane of the turbine, the combustion chamber means and the compressor; an occupancy chamber encompassed by the circumferential air inlet of the compressor; and a passage located between the compressor inlet and the occupancy chamber for conducting air from the opening to the compressor inlet.

3. An aircraft comprising a radial flow air compressor including a stator and a rotor and having a circumferential inlet at its inboard periphery and a circumferential outlet at its outboard periphery, a radial flow turbine disposed concentrically around the compressor and radially spaced therefrom, the turbine having a rotor fast to the compressor rotor and a stator and having a circumferential inlet at its inboard periphery and a circumferential outlet at its outboard periphery, combustion chamber means having a circumferential inlet registering with the compressor outlet and a circumferential outlet registering with the turbine inlet, fuel supply means for the combustion chamber means, the compressor supplying air which supports combustion of the fuel in the combustion chamber means, the products of combustion expanding to drive the turbine rotor which in turn drives the compressor rotor connected to it, means around the circumferential turbine outlet directing the exhaust gases to provide a propulsive thrust, and opposed aerofoil surfaces substantially covering the outer surfaces of the stators and spanning from the turbine stator to the compressor stator to enclose the combustion chamber means, the said aerofoil surfaces providing lift developing surfaces of the aircraft, the medial plane between the said surfaces being approximately parallel to the plane of rotation of the rotors.

4. An aircraft comprising a radial flow air compressor including a stator and a rotor and having a circumferential inlet at its inboard periphery and a circumferential outlet at its outboard periphery, a radial flow turbine disposed concentrically around the compressor and radially spaced therefrom, the turbine having a rotor fast to the compressor rotor and a stator and having a circumferential inlet at its inboard periphery and a circumferential outlet at its outboard periphery, combustion chamber means having a circumferential inlet registering with the compressor outlet and a circumferential outlet registering with the turbine inlet, fuel supply means for the combustion chamber means, the compressor supplying air which supports combustion of the fuel in the combustion chamber means, the products of combustion expanding to drive the turbine rotor which in turn drives the compressor rotor connected to it, a plurality of exhaust ducts having their inlet ends serially arranged side by side to provide an annular inlet which encompasses the circumferential turbine outlet, the said ducts comprising two similar but enantiomorphous groups, the outlet ends of ducts of one group extending in a direction which diverges relative to the direction in which the outlet ends of ducts of the other group extend, the exhaust gases emitted through the ducts thus providing a forward propulsive component of thrust and also providing a component of thrust which is perpendicular to the forward propulsive component of thrust, the said perpendicular component of thrust from the ducts of one group being opposed to the perpendicular component of thrust from the ducts of the other group, and opposed aerofoil surfaces substantially covering the outer surfaces of the ducts and of the stators and spanning from the turbine stator to the compressor stator to enclose the combustion chamber means, the said aerofoil surfaces providing lift developing surfaces of the aircraft, the medial plane between the said surfaces being approximately parallel to the plane of rotation of the rotors.

5. An aircraft comprising a radial flow air compressor including a stator and a rotor and having a circumferential inlet at its inboard periphery and a circumferential outlet at its outboard periphery, a radial flow turbine disposed concentrically around the compressor and annularly spaced therefrom, the turbine having a rotor fast to the compressor rotor and a stator and having a circumferential inlet at its inboard periphery and a circumferential outlet at its outboard periphery, a plurality of radially extending combustion chambers each having an inlet at one end and an outlet at the other end, the combustion chamber inlets being serially arranged side by side to provide a circumferential inlet registering with the compressor outlet, the combustion chamber outlets being serially arranged side by side to provide a circumferential outlet registering with the turbine inlet, fuel supply means for the combustion chambers, the compressor supplying air which supports combustion of the fuel in the combustion chambers, the products of combustion expanding to drive the turbine rotor which in turn drives the compressor connected to it, means around the circumferential turbine outlet directing the exhaust gases to provide a propulsive thrust, and opposed aerofoil surfaces substantially covering the outer surfaces of the stators and spanning from the turbine stator to the compressor stator to enclose the combustion chambers, the said aerofoil surfaces providing lift developing surfaces of the aircraft, the medial plane between the said surfaces being approximately parallel to the plane of rotation of the rotors.

6. An aircraft comprising a radial flow air compressor including a stator and a rotor and having a circumferential inlet at its inboard periphery and a circumferential outlet at its outboad periphery, a radial flow turbine disposed concentrically around the compressor and radially spaced therefrom, the turbine having a rotor fast to the compressor rotor and a stator and having a circumferential inlet at its inboard periphery and a circumferential outlet at its outboard periphery, combustion chamber means having a circumferential inlet registering with the compressor outlet and a circumferential outlet registering with the turbine inlet, fuel supply means for the combustion chamber means, the compressor supplying air which supports combustion of the fuel in the combustion chamber means, the products of combustion expanding to drive the turbine rotor which in turn drives the compressor rotor connected to it, means around the circumferential turbine outlet directing the exhaust gases to provide a propulsive thrust, an occupancy chamber encompassed by the compressor inlet, and opposed aerofoil surfaces substantially covering the outer surfaces of the stators and spanning from the turbine stator to the compressor stator to enclose the combustion chamber means, the said aerofoil surfaces providing lift developing surfaces of the aircraft, the medial plane between the said surfaces being approximately parallel to the plane of rotation of the rotors.

7. An aircraft comprising a radial flow air compressor including a stator and a rotor and having a circumferential inlet at its inboard periphery and a circumferential outlet at its outboard periphery, a radial flow turbine disposed concentrically around the compressor and radially spaced therefrom, the turbine having a rotor fast to the compressor rotor and a stator and having a circumferential inlet at its inboard periphery and a circumferential outlet at its outboard periphery, exhaust ducts having one end registering with the turbine outlet, the said ducts extending outboardly from the turbine outlet and having their other ends directed in a generally rearward sense, combustion chamber means having a circumferential inlet registering with the compressor outlet and a circumferential outlet registering with the turbine inlet, fuel supply means for the combustion chamber means, the compressor supplying air which supports combustion of the fuel in the combustion chamber means, the products of combustion expanding to drive the turbine rotor which in turn drives the compressor connected to it and thence being ejected through the ducts to provide a propulsive thrust, moveable flaps for flight control situate adjacent the said other ends of at least some of the ducts and operable upon the discharge therefrom, and opposed aerofoil surfaces substantially covering the outer surfaces of the stators and spanning from the turbine stator to the compressor stator to enclose the combustion chamber means, the said aerofoil surfaces providing lift developing surfaces of the aircraft, the medial plane between the said surfaces being approximately parallel to the plane of rotation of the rotors.

8. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of one of the annular structures, a first series of concentric rings of blades between the rotor and the stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a radial flow compressor having a circumferential inlet defined by the inboard ring of blades and a circumferential outlet defined by the outboard ring of blades, annularly arranged combustion chamber means having a circumferential inlet registering with the circumferential compressor outlet and having a circumferential outlet at its outboard periphery, a second series of concentric rings of blades between the rotor and the stator means, one of the rings of the second series comprising blades having their root ends secured to the rotor and their other ends extending towards the opposed stator means and another ring of the second series comprising blades having their root ends secured to the stator means and their other ends extending toward the rotor, the said rings of the second series on the stator means and on the rotor providing a radial flow turbine having a circumferential inlet defined by the inboard ring of turbine blades and a circumferential outlet defined by the outboard ring of turbine blades, the turbine inlet registreing with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

9. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, a group of annularly arranged bearings secured to each annular structure, and engaging the rotor, the said groups of bearings being concentric with the aforesaid bearing member and being located radially intermediate the bearing member and the outboard periphery of the rotor and cooperating with the bearing member to support the rotor, annular stator means secured to the inner side of one of the annular structures, a first series of concentric rings of blades between the rotor and the stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a radial flow compressor having a circumferential inlet defined by the inboard ring of blades and a circumferential outlet defined by the outboard ring of blades, annularly arranged combustion chamber means having a circumferential inlet registering with the circumferential compressor outlet and having a circumferential outlet at its outboard periphery, a second series of concentric rings of blades between the rotor and the stator means, one of the rings of the second series comprising blades having their root ends secured to the rotor and their other ends extending towards the opposed stator means and another ring of the second series comprising blades having their root ends secured to the stator means and their other ends extending toward the rotor, the said rings of the second series on the stator means and on the rotor providing a radial turbine having a circumferential inlet defined by the inboard ring of turbine blades and a circumferential outlet defined by the outboard ring of turbine blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine inlet directing the exhaust gases to provide a propulsive thrust, and opposed aerofoil surfaces substantially covering the outer sides of the frame, the said aerofoil surfaces providing lift developing surfaces of the aircraft.

10. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of one of the annular structures, a first series of concentric rings of blades between the rotor and the stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a radial flow compressor having a circumferential inlet defined by the inboard ring of blades and a circumferential outlet defined by the outboard ring of blades, a plurality of radially extending combustion chambers arranged in a ring, each combustion chamber being secured to the annular structure which supports the stator means and having an inlet at its inboard end and an outlet at its outboard end, the combustion chamber inlets being serially arranged side by side to provide a circumferential inlet registering with the circumferential compressor outlet, the combustion chamber outlets being serially arranged side by side to provide a circumferential outlet, a second series of concentric rings of blades between the rotor and the stator means, one of the rings of the second series comprising blades having their root ends secured to the rotor and their other ends extending towards the opposed stator means and another ring of the second series comprising blades having their root ends secured to the stator means and their other ends extending toward the rotor, the said rings of the second series on the stator means and on the rotor providing a radial flow turbine having a circumferential inlet defined by the inboard ring of turbine blades and a circumferential outlet defined by the outboard ring of turbine blades, the turbine inlet registering with the circumferential outlet of the combustion chambers, fuel supply means for the combustion chamber means, the compressor supplying air which supports combustion of the fuel in the combustion chambers, the products of combustion expanding to drive the turbine which in turn drives the compressor connected to it, means around the circumferential turbine inlet directing the exhaust gases to provide a propulsive thrust, and opposed aerofoil surfaces substantially covering the outer sides of the frame, the said aerofoil surfaces providing lift developing surfaces of the aircraft.

11. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of one of the annular structures, a first series of concentric rings of blades between the rotor and the stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a radial flow compressor having a circumferential inlet defined by the inboard ring of blades and a circumferential outlet defined by the outboard ring of blades, a plurality of radially extending combustion chambers arranged in a ring around and outboard of the radial compressor, each combustion chamber being secured to the annular structure which supports the stator means and having an inlet at its inboard end and an outlet at its outboard end, the combustion chamber inlets being serially arranged side by side to provide a circumferential inlet registering with the circumferential compressor outlet, the combustion chamber outlets being serially arranged side by side to provide a circumferential outlet, a group of annularly arranged bearings secured to each annular structure and engaging the rotor, the said groups of bearings being concentric with the aforesaid bearing member and cooperating with it to support the rotor, the bearings of one group being annularly arranged and being located between adjacent combustion chambers to engage one side of the rotor and the other group of bearings being located substantially opposite the said one group of bearings to engage the other side of the rotor, a second series of concentric rings of blades between the rotor and the stator means, one of the rings of the second series comprising blades having their root ends secured to the rotor and their other ends extending towards the opposed stator means and another ring of the second series comprising blades having their root ends secured to the stator means and their other ends extending toward the rotor, the said rings of the second series on the stator means and on the rotor providing a radial flow turbine having a circumferential inlet defined by the inboard ring of turbine blades and circumferential outlet defined by the outboard ring of turbine blades, the turbine inlet registering with the circumferential outlet of the combustion chambers, fuel supply means for the combustion chambers, the compressor supplying air which supports combustion of the fuel in the combustion chambers, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

12. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of one of the annular structures, a first series of concentric rings of blades between the rotor and the stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a radial flow compressor having a circumferential inlet defined by the inboard ring of blades and a circumferential outlet defined by the outboard ring of blades, a group of annularly arranged bearings secured to each annular structure, the said groups of bearings being concentric with the bearing member and cooperating with it to support the rotor, a shroud on the outboard ring of blades of the compressor rotor, one group of annularly arranged bearings engaging one side of the rotor through the shroud and the other group of bearings being located substantially opposite the said one group of bearings to engage the other side of the rotor, annularly arranged combustion chamber means having a circumferential inlet registering with the circumferential compressor outlet and having a circumferential outlet at its outboard periphery, a second series of concentric rings of blades between the rotor and the stator means, one of the rings of the second series comprising blades having their root ends secured to the rotor and their other ends extending towards the opposed stator means and another ring of the second series comprising blades having their root ends secured to the stator means and their other ends extending toward the rotor, the said rings of the second series on the stator means and on the rotor providing a radial flow turbine having a circumferential inlet defined by the inboard ring of turbine blades and a circumferential outlet defined by the outboard ring of turbine blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer side of the frame, the said aerofoil surfaces providing lift developing surfaces of the aircraft.

13. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of one of the annular structures, a first series of concentric rings of blades between the rotor and the stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a radial flow compressor having a circumferential inlet defined by the inboard ring of blades and a circumferential outlet defined by the outboard ring of blades, annularly arranged combustion chamber means having a circumferential inlet registering with the circumferential compressor outlet and having a circumferential outlet at its outboard periphery, a second series of concentric rings of blades between the rotor and the stator means, one of the rings of the second series comprising blades having their root ends secured to the rotor and their other ends extending towards the opposed stator means and another ring of the second series comprising blades having their root ends secured to the stator means and their other ends extending toward the rotor, the said rings of the second series on the stator means and on the rotor providing a radial flow turbine having a circumferential inlet defined by the inboard ring of turbine blades and a circumferential outlet defined by the outboard ring of turbine blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, opposed aerofoil surfaces substantially covering the outer sides of the frame, the said aerofoil surfaces providing lift developing surfaces of the aircraft, an opening being provided in at least one of the aerofoil surfaces, and a passage located between the compressor inlet and the hub for conducting air from the aerofoil opening to the compressor inlet.

14. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, annularly arranged combustion chamber means at each side of the rotor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

15. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, annularly arranged combustion chamber means at each side of the rotor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft, the fuel supply means including tanks located between the outer sides of the annular stator means and the inner sides of the aerofoil surfaces, the said tanks being substantially opposite the compressor.

16. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, a group of annularly arranged bearings secured to each annular structure and engaging the rotor, the said groups of bearings being concentric with the aforesaid bearing member and being located radially intermediate the bearing member and the outboard periphery of the rotor and cooperating with the bearing member to support the rotor, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, annularly arranged combustion chamber means at each side of the rotor and having a circumferential inlet registering with the circumferential compressor inlet and also having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

17. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, two groups of radially extending combustion chambers arranged in a ring, each combustion chamber having an inlet at its inboard end and an outlet at its outboard end, the combustion chambers of one group being secured to one annular structure and the combustion chambers of the other group being secured to the other annular structure, the inlets of the combustion chambers of each group being serially arranged side by side to provide a circumferential inlet registering with the circumferential compressor outlet, the outlets of the combustion chambers of each group being serially arranged side by side to provide a circumferential outlet, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the circumferential outlet of the combustion chambers, fuel supply means for the combustion chambers, the compressor supplying air which supports combustion of the fuel in the combustion chambers, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

18. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, two groups of radially extending combustion chambers arranged in a ring around and outboard of the radial compressor, each combustion chamber having an inlet at its inboard end and an outlet at its outboard end, the combustion chambers of one group being secured to one annular structure and the combustion chambers of the other group being secured to the other annular structure, the inlets of the combustion chambers of each group being serially arranged side by side to provide a circumferential inlet registering with the circumferential compressor outlet, the outlets of the combustion chambers of each group being serially arranged side by side to provide a circumferential outlet, a group of annularly arranged bearings secured to each annular structure and engaging the rotor, the said groups of bearings being concentric with the aforesaid bearing member and cooperating with it to support the rotor, the bearings of one group being annularly arranged and being located between adjacent combustion chambers to engage one side of the rotor and the bearings of the other group being annularly arranged and being located between adjacent combustion chambers to engage the other side of the rotor, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the circumferential outlet of the combustion chambers, fuel supply means for the combustion chambers, the compressor supplying air which supports combustion of the fuel in the combustion chambers, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

19. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, a group of annularly arranged bearings secured to each annular structure, the said groups of bearings being concentric with the bearing member and cooperating with it to support the rotor, a shroud on the blades at one side of the rotor which are comprised in the outboard ring, a shroud on the blades at the other side of the rotor which are comprised in the outboard ring, one group of annularly arranged bearings engaging one side of the rotor through one shroud and the other group of annularly arranged bearings engaging the other side of the rotor through the other shroud, combustion chamber means at each side of the rotor annularly disposed around and outboard of the radial compressor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

20. An aircraft comprising a hollow hub, an annular rotor mounted for rotation relative to and around the hub, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, combustion chamber means at each side of the rotor annularly disposed around and outboard of the radial compressor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, opposed aerofoil surfaces substantially covering the outer sides of the frame, the said aerofoil surfaces providing lift developing surfaces of the aircraft, openings being provided in the aerofoil surfaces, and passages located between the circumferential compressor inlet and the hub for conducting air from the aerofoil openings to the compressor inlet.

21. An aircraft comprising a hollow hub, a bearing member annularly disposed around the hub and secured thereto, an annular rotor coaxially mounted relative to the bearing member and rotatable thereon, an annular structure on each side of the rotor and firmly secured to the hub, the annular structure being of larger diameter than the rotor to provide portions extending outboard of the rotor, the said extending portion of one annular structure being secured to the extending portion of the other annular structure to provide a frame within which the rotor is encompassed, inboard annular stator means secured to the inner side of each of the annular structures and spaced from the rotor, a series of concentric rings of blades in the spaces between the rotor and the two inboard stator means, alternate rings of the series comprising blades having their root ends secured to the rotor and their other ends extending toward the opposed inboard stator means and the other rings of the series comprising blades having their root ends secured to the inboard stator means and their other ends extending toward the rotor, the said rings on the inboard stator means and on the rotor providing a double-sided radial flow compressor having a circumferential inlet at each side of the rotor defined by the inboard ring of blades and a circumferential outlet at each side of the rotor defined by the outboard ring of blades, two groups of radially extending combustion chambers arranged in a ring around and outboard of the radial flow compressor, each combustion chamber having an inlet at its inboard end and an outlet at its outboard end, the combustion chambers of one group being secured to one annular structure and the combustion chambers of the other group being secured to the other annular structure, the inlets of the combustion chambers of each group being serially arranged side by side to provide a circumferential inlet registering with the circumferential compressor outlet, the outlets of the combustion chambers of each group being serially arranged side by side to provide a circumferential outlet, outboard annular stator means at the inner side of each of the annular structures and spaced from the rotor, each of the said outboard stator means comprising a plurality of annulus sectors serially arranged side by side to provide an annulus, means adjustably securing each annulus sector to the adjacent annular structure, a series of concentric rings of blades in the spaces between the rotor and the two outboard stator means, one of the rings of the last-mentioned series comprising blades having their root ends secured to the rotor and their other ends extending toward the opposed outboard stator means and another ring of the last-mentioned series comprising blades having their root ends secured to the stator means and their other ends extending toward the rotor, the said rings of the last-mentioned series on the outboard stator means and on the rotor providing a double-sided radial flow turbine having a circumferential inlet at each side of the rotor defined by the inboard ring of blades of the last-mentioned series and a circumferential outlet at each side of the rotor defined by the outboard ring of blades of the last-mentioned series, the turbine inlet registering with the circumferential outlet of the combustion chambers, fuel supply means for the combustion chambers, the compressor supplying air which supports combustion of the fuel in the combustion chambers, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

22. An aircraft comprising a ring, an annular rotor coaxially mounted relative to the ring and rotatable relative thereto, an annular structure on each side of the rotor and firmly secured to the ring, the annular structures together comprising a plurality of pairs of angularly spaced rib members radiating outboardly from the bearing member, one member of each pair forming part of one annular structure and the other member of each pair forming part of the other annular structure, the two members of the pairs being disposed relative to each other in a generally enantiomorphous arrangement with their inboard ends secured to and spaced by the ring and with their outboard ends extending beyond the periphery of the rotor and being spaced but rigidly secured together, the two annular structures thus providing a frame which encompasses an annular space particularly defined by the inner opposed edges of the rib members of each pair and which hollow space is bisected by the rotor, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, annularly arranged combustion chamber means at each side of the rotor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

23. An aircraft comprising a ring, an annular rotor coaxially mounted relative to the ring and rotatable relative thereto, a perimetrical wall disposed within but spaced from the ring and providing an occupancy chamber, an annular structure on each side of the rotor and firmly secured to the ring, the annular structures together comprising a plurality of pairs of angularly spaced rib members radiating outboardly from the bearing member, one member of each pair forming part of one annular structure and the other member of each pair forming part of the other annular structure, the two members of the pairs being disposed relative to each other in a generally enantiomorphous arrangement with their inboard ends secured to and spaced by the ring and with their outboard ends extending beyond the periphery of the rotor and being spaced but rigidly secured together, and a plurality of angularly spaced ribs radiating inboardly from the ring to the perimetrical wall, the inboard ends of the said ribs being secured to the perimetrical wall and the outboard ends being spaced from and secured to the ring so that their outer edges are substantially in the same surface as the outer edges of the outboardly radiating rib members, the two annular structures thus providing a frame which encompasses an annular space particularly defined by the inner opposed edges of the outboardly radiating members of each pair and which hollow space is bisected by the rotor, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, annularly arranged combustion chamber means at each side of the rotor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, and opposed aerofoil surfaces substantially covering the outer sides of the frame, the said aerofoil surfaces providing lift developing surfaces of the aircraft.

24. An aircraft comprising a ring, an annular rotor coaxially mounted relative to the ring and rotatable relative thereto, a perimetrical wall disposed within but spaced from the ring and providing an occupancy chamber, an annular structure on each side of the rotor and firmly secured to the ring, the annular structures together comprising a plurality of pairs of angularly spaced rib members radiating outboardly from the ring, one member of each pair forming part of one annular structure and the other member of each pair forming part of the other annular structure, the two members of the pairs being disposed relative to each other in a generally enantiomorphous arrangement with their inboard ends secured to and spaced by the ring and with their outboard ends extending beyond the periphery of the rotor and being spaced but rigidly secured together, and a plurality of angularly spaced ribs radiating inboardly from the ring to the perimetrical wall, the inboard ends of the said ribs being secured to the perimetrical wall and the outboard ends being spaced from and secured to the ring so that their outer edges are substantially in the same surface as the outer edges of the outboardly radiating rib members, the two annular structures thus providing a frame which encompasses an annular space particularly defined by the inner opposed edges of the outboardly radiating members of each pair and which hollow space is bisected by the rotor, annular stator means secured to the inner side of each of the annular structures and spaced from the rotor, a first series of concentric rings of blades in the spaces between the rotor and the two stator means, alternate rings of the series comprising blades having their root ends secured to the rotor and their other ends extending toward the opposed stator means and the other rings of the series comprising blades having their root ends secured to the stator means and their other ends extending toward the rotor, the said rings on the stator means and on the rotor providing a double-sided radial flow compressor having a circumferential inlet at each side of the rotor defined by the inboard ring of blades and a circumferential outlet at each side of the rotor defined by the outboard ring of blades, annularly arranged combustion chamber means at each side of the rotor and having a circumferential inlet registering with the circumferential compressor inlet and having a circumferential outlet at the outboard periphery, a second series of concentric rings of blades in the spaces between the rotor and the two stator means, one of the rings of the second series comprising blades having their root ends secured to the rotor and their other ends extending toward the opposed stator means and another ring of the series comprising blades having their root ends secured to the stator means and their other ends extending toward the rotor, the said rings of the second series on the stator means and on the rotor providing a double-sided radial flow turbine having a circumferential inlet at each side of the rotor defined by the inboard ring of blades and a circumferential outlet at each side of the rotor defined by the outboard ring of blades, the turbine inlet registering with the outlet of the combustion chamber means, fuel supply means for the combustion chamber means, the compressor supplying air which supports combustion of the fuel in the combustion chamber means, the products of combustion expanding to drive the turbine which in turn drives the compressor connected to it, means around the circumferential turbine outlet directing the exhaust gases to provide a propulsive thrust, opposed aerofoil surfaces substantially covering the outer sides of the frame, the said aerofoil surfaces providing lift developing surfaces of the aircraft and also providing the outer walls of an annular chamber which is encompassed by the circumferential compressor inlet and the inboard limits of which are defined by the perimetrical wall, and ports in the aerofoil surfaces to provide air inlets for the chamber.

25. An aircraft comprising a structure including an annular bearing member and a plurality of pairs of angularly spaced rib members radiating from the bearing member in an outboard direction, the two members of the pairs being disposed relative to each other in a generally enantiomorphous arrangement with their inboard ends secured to and spaced by the bearing member and with their outboard ends spaced but rigidly secured together, the plurality of radiating rib members thus encompassing an annular space particularly defined by the inner opposed edges of the members of each pair, opposed aerofoil surfaces sheathing the outer edges of the rib members to substantially cover the structure and providing lift developing surfaces of the aircraft, a radial flow compressor in the inboard portion of the hollow space, a radial flow turbine in the outboard portion and having a circumferential outlet at its outboard periphery, combustion chamber means in the intermediate portion and joining the compressor to the turbine, an annular rotor mounted for rotation at its inner periphery on the annular bearing member and dividing the aforesaid annular space into two halves, the inboard portion of the rotor providing a rotor for the compressor and its outboard portion providing a rotor for the turbine, fuel supply means for the combustion chamber means, the compressor supplying air which supports combustion of the fuel in the combustion chamber means, the products of combustion expanding to drive the turbine which in turn drives the compressor, and means around the circumferential turbine outlet directing the exhaust gases to provide a propulsive thrust.

26. An aircraft comprising a structure including an annular bearing member and a plurality of pairs of angularly spaced rib members radiating from the bearing member in an outboard direction, the two members of the pairs being disposed relative to each other in a generally enantiomorphous arrangement with their inboard ends secured to and spaced by the bearing member and with their outboard ends spaced but rigidly secured together, the plurality of radiating rib members thus encompassing an annular space particularly defined by the inner opposed edges of the members of each pair, a perimetrical wall disposed within but spaced from the annular bearing member and providing an occupancy chamber, a plurality of angularly spaced ribs radiating inboardly from the bearing member to the perimetrical wall, the inboard ends of the said ribs being secured to the perimetrical wall and the outboard ends being spaced from and secured to the bearing member so that their outer edges are substantially in the same surfaces as the outer edges of the outboardly radiating rib members, opposed aerofoil surfaces sheathing the outer edges of the rib members and of the ribs from the outboard ends of the rib members to the perimetrical wall to substantially cover the structure and providing lift developing surfaces of the aircraft, a radial flow compressor in the inboard portion of the hollow space, a radial flow turbine in the outboard portion and having a circumferential outlet at its outboard periphery, combustion chamber means in the intermediate portion and joining the compressor to the turbine, an annular rotor mounted for rotation at its inner periphery on the annular bearing member and dividing the aforesaid annular space into two halves, the inboard portion of the rotor providing a rotor for the compressor and its outboard portion providing a rotor for the turbine, fuel supply means for the combustion chamber means, the compressor supplying air which supports combustion of the fuel in the combustion chamber means, the products of combustion expanding to drive the turbine which in turn drives the compressor, and means around the circumferential turbine outlet directing the exhaust gases to provide a propulsive thrust.

27. An aircraft comprising a structure including an annular bearing member and a plurality of pairs of angularly spaced rib members radiating from the bearing member in an outboard direction, the two members of the pairs being disposed relative to each other in a generally enantiomorphous arrangement with their inboard ends secured to and spaced by the bearing member and with their outboard ends spaced but rigidly secured together, the plurality of radiating rib members thus encompassing an annular space particularly defined by the inner opposed edges of the members of each pair, a perimetrical wall disposed within but spaced from the annular bearing member and providing an occupancy chamber, a plurality of angularly spaced ribs radiating inboardly from the bearing member to the perimetrical wall, the inboard ends of the said ribs being secured to the perimetrical wall and the outboard ends being spaced from and secured to the bearing member so that their outer edges are substantially in the same surfaces as the outer edges of the outboardly radiating rib members, opposed aerofoil surfaces sheathing the outer edges of the rib members and of the ribs from the outboard ends of the rib members to the perimetrical wall to substantially cover the structure and providing lift developing surfaces of the aircraft, a radial flow compressor in the inboard portion of the hollow space, a radial flow turbine in the outboard portion and having a circumferential outlet at its outboard periphery, combustion chamber means in the intermediate portion and joining the compressor to the turbine, an annular rotor mounted for rotation at its inner periphery on the annular bearing member and dividing the aforesaid annular space into two halves, the inboard portion of the rotor providing a rotor for the compressor and its outboard portion providing a rotor for the turbine, the opposed aerofoil surfaces also providing the outer walls of an air supply chamber which is encompassed by the compressor and the inboard limits of which are defined by the perimetrical wall, ports in the aerofoil surfaces to provide air inlets for the chamber, fuel supply means for the combustion chamber means, the compressor supplying air which supports combustion of the fuel in the combustion chamber means, the products of combustion expanding to drive the turbine which in turn drives the compressor, and means around the circumferential turbine outlet directing the exhaust gases to provide a propulsive thrust.

28. An aircraft comprising a generally lenticular structure sheathed by opposed lift developing surfaces, a gas displacement passage in the structure having an inlet and a substantially annular outlet adjacent to the periphery of the structure, the passage extending generally radially from the yaw axis of the aircraft in a multiplicity of diverging directions, the annulus defining the outlet being disposed generally perpendicular to the yaw axis, means for impelling air to flow through the passage from the intake in a plurality of centrifugal directions relative to the yaw axis, means for compressing the centrifugally flowing air, means for burning fuel in the compressed air, the combustion gases resulting from the burning of the fuel being emitted from the outlet, and further means, associated with the outlet, for directing the gases emitted from the outlet to provide the aircraft with a resultant thrust in a desired direction.

29. An aircraft comprising a generally lenticular structure sheathed by opposed lift developing surfaces, a central plenum chamber in said structure, a gas displacement passage in the structure having an intake at said plenum chamber and having a substantially annular outlet adjacent to the periphery of the structure, the passage extending generally radially from the yaw axis of the aircraft in a multiplicity of diverging directions, the annulus defining the outlet being disposed generally perpendicular to the yaw axis, means for impelling air to flow through the passage from the plenum chamber in a plurality of centrifugal directions relative to the yaw axis, means for compressing the centrifugally flowing air, means for burning fuel in the compressed air, the combustion gases resulting from the burning of the fuel being emitted from the outlet, and further means, associated with the outlet, for directing the gases emitted from the outlet to provide the aircraft with a resultant thrust in a desired direction.

References Cited in the file of this patent

UNITED STATES PATENTS

| | | |
|---|---|---|
| 2,377,835 | Weygers | June 5, 1945 |
| 2,384,893 | Crook | Sept. 18, 1945 |
| 2,461,435 | Neumann | Feb. 8, 1949 |
| 2,511,502 | Gluhareff | June 13, 1950 |
| 2,575,264 | Feilden | Nov. 13, 1951 |
| 2,609,664 | Staley | Sept. 9, 1952 |
| 2,619,302 | Loedding | Nov. 25, 1952 |
| 2,736,514 | Ross | Feb. 28, 1956 |
| 2,850,250 | Smith | Sept. 2, 1958 |

FOREIGN PATENTS

| | | |
|---|---|---|
| 331,292 | France | July 24, 1903 |
| 713,330 | France | Aug. 11, 1931 |